US010692171B2

(12) United States Patent
Hong et al.

(10) Patent No.: US 10,692,171 B2
(45) Date of Patent: Jun. 23, 2020

(54) METHOD OF OPERATING VIRTUAL ADDRESS GENERATOR AND METHOD OF OPERATING SYSTEM INCLUDING THE SAME

(71) Applicant: SAMSUNG ELECTRONICS CO., LTD., Suwon-si, Gyeonggi-Do (KR)

(72) Inventors: Sung Min Hong, Yongin-si (KR); Jae Young Hur, Hwaseong-si (KR); Min Je Jun, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 216 days.

(21) Appl. No.: 15/353,226

(22) Filed: Nov. 16, 2016

(65) Prior Publication Data

US 2017/0140501 A1 May 18, 2017

(30) Foreign Application Priority Data

Nov. 17, 2015 (KR) ........................ 10-2015-0161359

(51) Int. Cl.
*G06T 1/60* (2006.01)
*G06F 12/06* (2006.01)
*G06T 3/60* (2006.01)
*H04N 5/76* (2006.01)

(52) U.S. Cl.
CPC ............ *G06T 1/60* (2013.01); *G06F 12/0646* (2013.01); *G06T 3/606* (2013.01); *H04N 5/76* (2013.01); *G06F 2212/65* (2013.01)

(58) Field of Classification Search
None
See application file for complete search history.

(56) References Cited

U.S. PATENT DOCUMENTS

| | | | | |
|---|---|---|---|---|
| 5,613,018 A | * | 3/1997 | Eldridge | ................ G06T 3/606 345/658 |
| 5,990,912 A | * | 11/1999 | Swanson | ............. G06F 12/0207 345/531 |
| 6,072,507 A | | 6/2000 | Balatsos et al. | |
| 6,154,600 A | * | 11/2000 | Newman | ............... G06F 3/0213 348/552 |
| 6,295,134 B1 | * | 9/2001 | Hughes | ................. G06K 15/00 358/1.13 |
| 6,667,745 B1 | | 12/2003 | Hussain | |
| 8,400,529 B2 | | 3/2013 | Lim | |
| 8,817,033 B2 | | 8/2014 | Hur et al. | |
| 2001/0019331 A1 | | 9/2001 | Nielsen et al. | |
| 2004/0231000 A1 | | 11/2004 | Gossalia et al. | |

(Continued)

FOREIGN PATENT DOCUMENTS

KR 10-2012-0074707 7/2012

*Primary Examiner* — Xiao M Wu
*Assistant Examiner* — Steven Z Elbinger
(74) *Attorney, Agent, or Firm* — F. Chau & Associates, LLC (57) ABSTRACT

A method of generating a virtual address in a data processing system controller includes receiving and analyzing attribute information which indicates whether user intervention is possible for allocating a memory buffer for storing image data; enabling one of a first virtual address generator or a second virtual address generator based on an analysis result; and generating the virtual address of a data transaction using the enabled virtual address generator.

17 Claims, 9 Drawing Sheets

(56) References Cited

U.S. PATENT DOCUMENTS

| | | |
|---|---|---|
| 2009/0204784 A1* | 8/2009 | Favergeon-Borgialli ................... G06F 12/0207 711/203 |
| 2009/0244074 A1* | 10/2009 | Montrym .................. G06T 1/60 345/522 |
| 2009/0254728 A1* | 10/2009 | Kamensky .......... G06F 12/0223 711/170 |
| 2010/0123907 A1* | 5/2010 | Edgar ................ G06K 9/00483 358/1.5 |
| 2012/0124276 A1 | 5/2012 | Ahn et al. |
| 2013/0286028 A1* | 10/2013 | Hur .......................... G09G 5/39 345/540 |
| 2014/0258674 A1* | 9/2014 | Kim ................... G06F 12/1027 711/204 |
| 2014/0310495 A1 | 10/2014 | Michelogiannakis et al. |
| 2015/0206277 A1* | 7/2015 | Rao ...................... G06F 9/5016 345/520 |

\* cited by examiner

Transaction Virtual Address = (TileSize) x (TileNumber) + (TransactionSize) x (LineNumberInTile)
TileNumber is calculated as follows:

| Row | Col | TileNumber |
|---|---|---|
| Even | Even | ( RowNumber    x TilePerRow) + (ColumnNumber) x 2 |
| Even | Odd | ( RowNumber    x TilePerRow) + (ColumnNumber) x 2 − 1 |
| Odd | Even | ((RowNumber−1) x TilePerRow) + (ColumnNumber) x 2 + 2 |
| Odd | Odd | ((RowNumber−1) x TilePerRow) + (ColumnNumber) x 2 + 1 |

TilePerRow : Number of tiles per row
TileSize : Tile size in bytes
TransactionSize : Transaction size in bytes
LineNumberInTile : Line number in a tile

METHOD OF OPERATING VIRTUAL ADDRESS GENERATOR AND METHOD OF OPERATING SYSTEM INCLUDING THE SAME

CROSS-REFERENCE TO RELATED APPLICATION

This application claims priority under 35 U.S.C. § 119(a) from, and the benefit of, Korean Patent Application No. 10-2015-0161359 filed on Nov. 17, 2015, the contents of which are herein incorporated by reference in their entirety.

BACKGROUND

Embodiments of the inventive concept are directed to a virtual address generator, and more particularly, to a method of operating a virtual address generator which generates a virtual address using an address generator selected from address generators that use at least one type of attribute and mode information and to a method of operating a system that includes the virtual address generator.

A memory management unit (MMU) is a computer hardware component which manages central processing unit (CPU) memory accesses. An MMU can translate a virtual memory address into a physical memory address and can also perform memory protection, cache control, and bus arbitration.

An MMU divides a virtual address space, such as the range of addresses used in a processor, into pages. Each of the pages includes a virtual memory address and a physical memory address. The MMU refers to a translation lookaside buffer (TLB) to translate a virtual memory address into a physical memory address. When wanted translation information does not exist in the TLB, that is, when TLB miss occurs, the MMU fetches the translation information from a page table stored in a memory device. When a TLB miss occurs, MMU performance may be degraded.

Mobile devices that include an MMU are widely used; image rotation is generally used in mobile devices. Examples of the use of the image rotation include displaying in landscape mode a video captured by a camera in portrait mode; and displaying in landscape mode a video stored in memory in portrait mode.

When an image is rotated and an address map is linear, the performance of an MMU may be unsatisfactory. For instance, when the size of video is large, an address difference between adjacent transactions may be large. At this time, TLB miss may occur.

Therefore, image rotation may be a performance bottleneck in a mobile device.

SUMMARY

According to some embodiments of the inventive concept, there is provided a method of generating a virtual address in a data processing system controller. The method includes receiving and analyzing attribute information which indicates whether user intervention is possible for allocating a memory buffer for storing image data; enabling one of a first virtual address generator or a second virtual address generator based on an analysis result; and generating the virtual address of a data transaction using the enabled virtual address generator.

The first virtual address generator generates the virtual address based on coordinates of a pixel, a size of the pixel, and a size of the image data. The second virtual address generator generates the virtual address based on a size of a tile in the image data, a number of the tile to be processed, a size of the data transaction, and a line number in the tile.

The first virtual address generator may be enabled when the attribute information indicates that the user intervention is possible and the second virtual address generator may be enabled when the attribute information indicates that the user intervention is impossible.

The number of the tile to be processed may be determined based on a function of a position of the tile and a total number of tiles included in a row of the image data.

The method may further include analyzing a pattern of the image data and generating mode information about a processing mode of the image data based on an analysis result. At this time, the one of the first and second virtual address generators is enabled based on the analysis result and the mode information.

The first virtual address generator may be enabled when the mode of processing is a raster scan mode and the second virtual address generator may be enabled when the mode of processing is a non-raster scan mode for image rotation.

The second virtual address generator may generate the virtual address to generate a hierarchical tile address map; the hierarchical tile address map may include a plurality of super tiles arranged in linear order; each of the super tiles may include a plurality of tiles arranged in linear order; and each of the tiles may include a plurality of pixels addressed in linear order.

According to other embodiments of the inventive concept, there is provided a system for generating memory addresses. The system includes a virtual address generator that includes a first virtual address generator and a second virtual address generator, wherein the virtual address generator receives and analyzes attribute information which indicates whether user intervention is possible for allocating a memory buffer for storing image data enables one of the first and second virtual address generators based on an analysis result and generates a virtual address of a data transaction using the enabled virtual address generator; and a memory management unit that translates the virtual address into a physical address.

The system may further include a central processing unit (CPU) of the processor that provides a software interface for setting the attribute information.

According to other embodiments of the inventive concept, there is provided a system for generating memory addresses that includes a virtual address generator that includes a first virtual address generator and a second virtual address generator, wherein the virtual address generator receives and analyzes attribute information which indicates whether user intervention is possible for allocation of a memory buffer for storing image data, enables one of the first and second virtual address generators based on an analysis result, wherein the first virtual address generator generates a virtual address based on coordinates of a pixel, a size of the pixel, and a size of the image data; and the second virtual address generator generates the virtual address based on a size of a tile in the image data, a number of the tile to be processed, a size of the data transaction, and a line number in the tile.

The system may further include a memory management unit that translates the virtual address into a physical address; and a central processing unit (CPU) that provides a software interface for setting the attribute information.

DETAILED DESCRIPTION OF EXEMPLARY EMBODIMENTS

Embodiments of the inventive concept now will be described more fully hereinafter with reference to the accompanying drawings, in which exemplary embodiments of the disclosure are shown. Embodiments of this disclosure may, however, have many different forms and should not be construed as limited to the embodiments set forth herein. In the drawings, the size and relative sizes of layers and regions may be exaggerated for clarity. Like numbers may refer to like elements throughout.

It will be understood that when an element is referred to as being "connected" or "coupled" to another element, it can be directly connected or coupled to the other element or intervening elements may be present.

Figure 1:
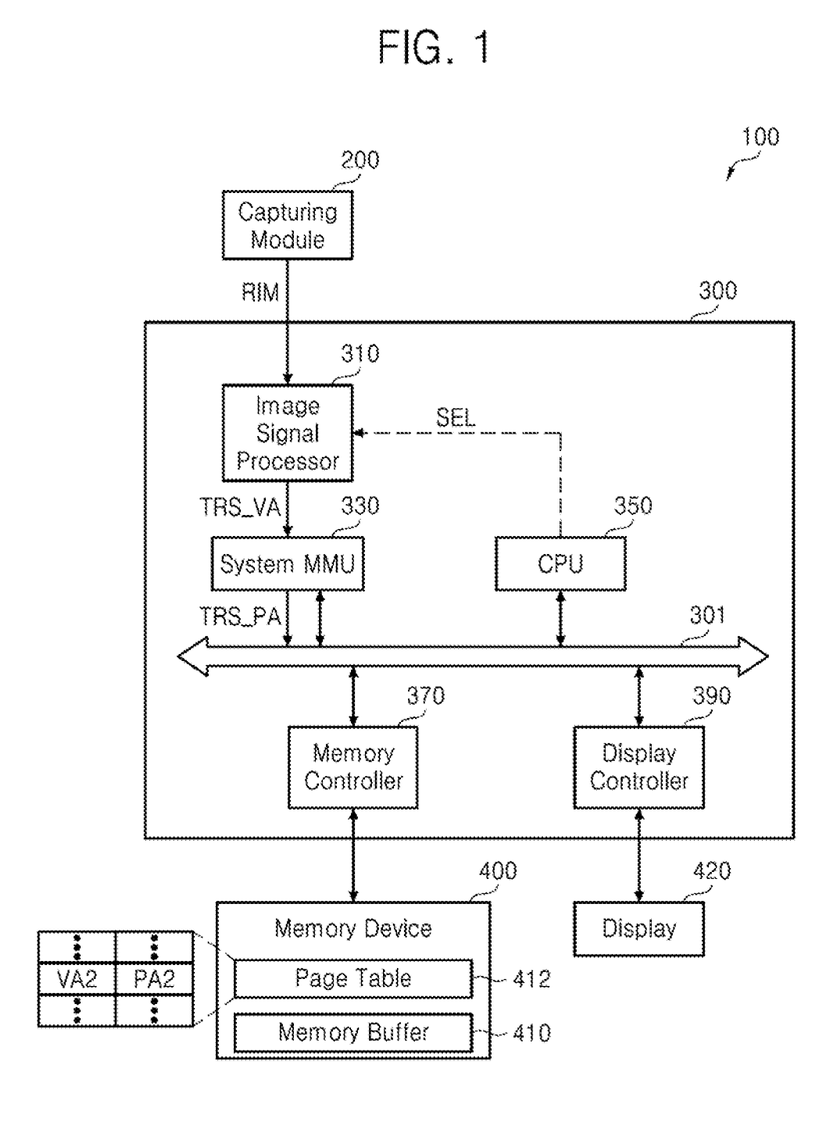
FIG. 1 is a block diagram of a data processing system according to some embodiments of the inventive concept.

FIG. 1 is a block diagram of a data processing system 100 according to some embodiments of the inventive concept. The data processing system 100 includes a capturing module 200, a controller 300, a memory device 400, and a display 420. The data processing system 100 can be implemented as a mobile device. The mobile device may be a laptop computer, a cellular phone, a smart phone, a tablet personal computer (PC), a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, or an internet of everything (IoE) device, but embodiments are not restricted thereto.

According to some embodiments, the capturing module 200 is a device which can convert an optical image into electrical image data RIM. The capturing module 200 includes an image sensor and a control circuit which controls the operations of the image sensor. The image sensor is a complementary metal-oxide semiconductor (CMOS) image sensor chip. The capturing module 200 and the controller 300 can communicate (or transmit and receive data) with each other using a mobile industry processor interface (MIPI®) camera serial interface (CSI). The capturing module 200 may be a camera.

According to some embodiments, the controller 300 controls the operations of the capturing module 200, the memory device 400, and the display 420. The controller 300 may be implemented as a processor, an application processor (AP), a mobile AP, a system on chip (SoC), a chipset, or a set of semiconductor chips, but embodiments of the inventive concept are not restricted to these examples. The controller 300 can be packaged into a single package. The controller 300 included a bus 301, an image signal processor (ISP) 310, a system memory management unit (MMU) 330, a central processing unit (CPU) 350, a memory controller 370, and a display controller 390.

According to some embodiments, the ISP 310 receives and processes the image data RIM output from the capturing module 200, selects one of a plurality of virtual address generators using attribute information SEL received from the CPU 350, and generates a virtual address using the selected virtual address generator. Therefore, the ISP 310 can perform the function of a virtual address generator. A virtual address may be a start virtual address generator.

According to some embodiments, the ISP 310 can send a first transaction TRS_VA that includes a virtual address to the system MMU 330. The first transaction TRS_VA includes a virtual address and image data processed by the ISP 310. The first transaction TRS_VA writes the image data processed by the ISP 310 to a memory buffer 410 of the memory device 400. The structure and operations of the ISP 310 for generating a virtual address will be described in detail with reference to FIGS. 4A through 9.

According to some embodiments, the system MMU 330 translates a virtual memory address, referred to as a "virtual address", into a physical memory address, referred to as a "physical address". The system MMU 330 converts the first transaction TRS_VA that includes a virtual address into a second transaction TRS_PA that includes a physical address. The second transaction TRS_PA includes a physical address and image data processed by the ISP 310. The second transaction TRS_PA writes the image data processed by the ISP 310 to the memory buffer 410 of the memory device 400.

Figure 2:
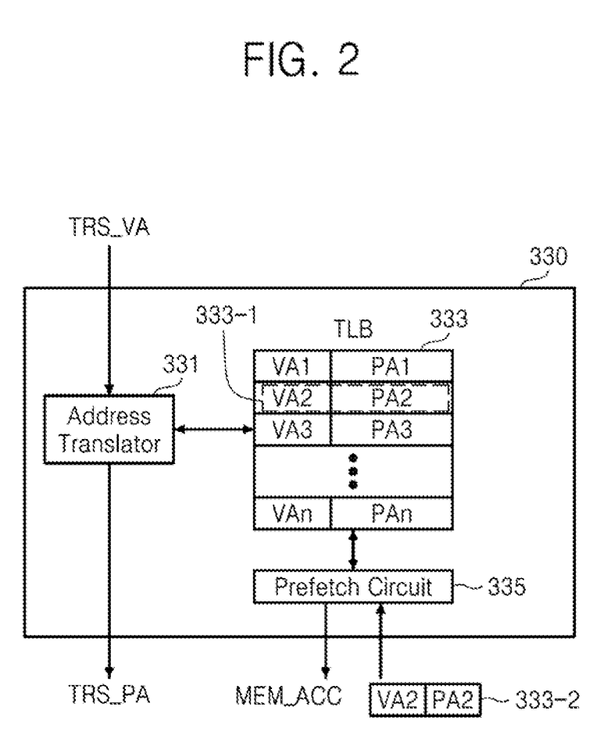
FIG. 2 is a block diagram that illustrates a structure and method of operating a system memory management unit (MMU) illustrated in FIG. 1.

FIG. 2 is a block diagram that illustrates the structure and method of operating the system MMU 330 illustrated in FIG. 1. Referring to FIGS. 1 and 2, the system MMU 330 includes an address translator 331, a translation lookaside buffer (TLB) 333, and a prefetch circuit 335.

When the TLB 333 does not include a virtual address VA2 and a physical address PA2, that is, when a TLB miss occurs; the address translator 331 controls the TLB 333 and/or the prefetch circuit 335. When a TLB miss occurs, the prefetch circuit 335 may perform a page table walk.

According to some embodiments, the prefetch circuit 335 sends the memory device 400 an access request MEM_ACC for accessing a page table 412 of the memory device 400. The access request MEM_ACC is a request for fetching the virtual address VA2 and the physical address PA2 from the page table 412. The prefetch circuit 335 stores the virtual address VA2 and the physical address PA2 fetched from the page table 412 in a buffer region 333-1 of the TLB 333. The TLB 333 stores physical addresses PA1 through PAn that respectively correspond to virtual addresses VA1 through VAn.

An operation of fetching a virtual address, such as the virtual address VA2, and a physical address, such as the physical address PA2, is referred to as a page table walk. The system MMU 330 performs a prefetch to hide page table walk latency. A TLB entry may cover a 4-KB virtual address space.

According to some embodiments, the CPU 350 controls the overall operation of the controller 300. The CPU 350 generates the attribute information SEL to be provided to the ISP 310.

Figure 3:
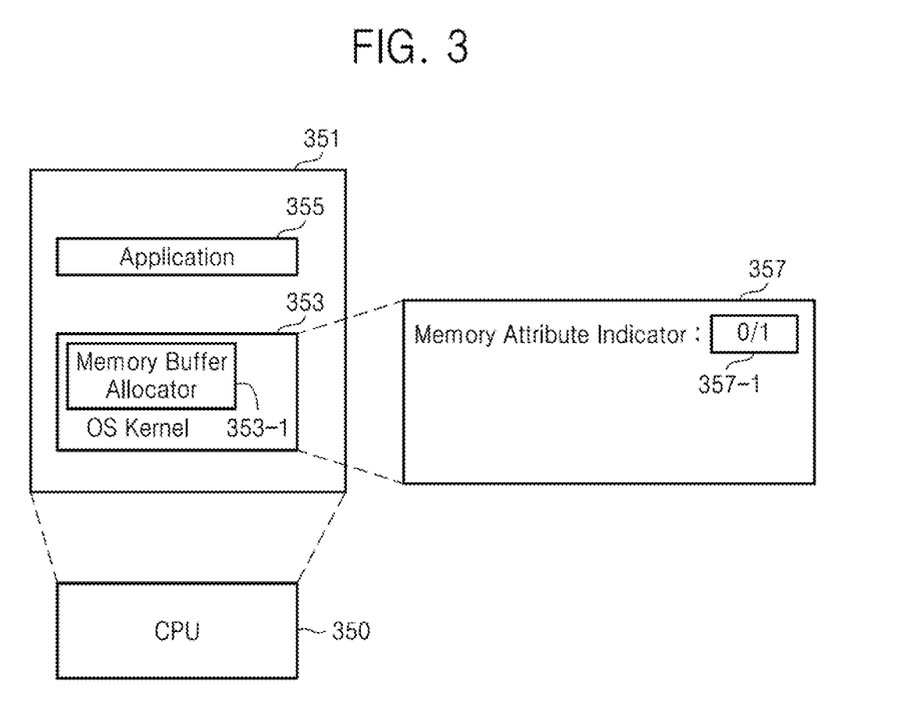
FIG. 3 is a conceptual diagram that illustrates the operations of a memory buffer allocator according to some embodiments of the inventive concept.

FIG. 3 is a conceptual diagram that illustrates the operations of a memory buffer allocator 353-1 according to some embodiments of the inventive concept. Referring to FIGS. 1 and 3, the CPU 350 executes a program or software 351. The program 351 includes an operating system (OS) kernel 353 and an application program 355.

According to some embodiments, the OS kernel 353 includes the memory buffer allocator 353-1. The memory buffer allocator 353-1 provides a software interface 357 for a user. The user may be a software application developer. The memory buffer allocator 353-1 includes or provides a software interface 357-1 which can set a memory attribute indicator.

When the software interface 357-1 is set to logic "0" or data "0", user intervention is not possible for the allocation of the memory buffer 410. When the software interface 357-1 is set to logic "1" or data "1", user intervention is possible for the allocation of the memory buffer 410. Information set in the interface 357-1, such as the attribute information SEL that corresponds to logic "0" or logic "1", can be sent to the ISP 310. The attribute information SEL may be sent to the ISP 310 through a register configuration, the bus 301, or a dedicated line.

According to some embodiments, the memory controller 370 controls access operations, such as a write operation or a read operation, of the memory device 400 under control of the system MMU 330 and/or the CPU 350. The memory controller 370 controls access operations based on the second transaction TRS_PA, which includes a physical address. Although one memory controller 370 and one memory device 400 are illustrated in FIG. 1, the memory device 400 may collectively refer to volatile memory devices and/or non-volatile memory devices and the memory controller 370 may collectively refer to a plurality of memory controllers which respectively control each memory device 400 defined in a collective concept.

A volatile memory device may be a random access memory (RAM) or a dynamic RAM (DRAM). A non-volatile memory device may be implemented as a flash-based memory device, an embedded multimedia card (eMMC), or a universal flash storage (UFS), but embodiments of the inventive concept is not restricted to these examples.

According to some embodiments, the memory device 400 includes the memory buffer 410 for storing the image data RIM received from the capturing module 200 and/or image data processed by the ISP 310, and the page table 412 that includes pages. Each of the pages includes a virtual address and a physical address which are mapped to each other.

According to some embodiments, the display controller 390 transmits data to be displayed to the display 420 under the control of the CPU 350. The display controller 390 and the display 420 communicate with each other using an MIPI® display serial interface (DSI).

Figure 4A:
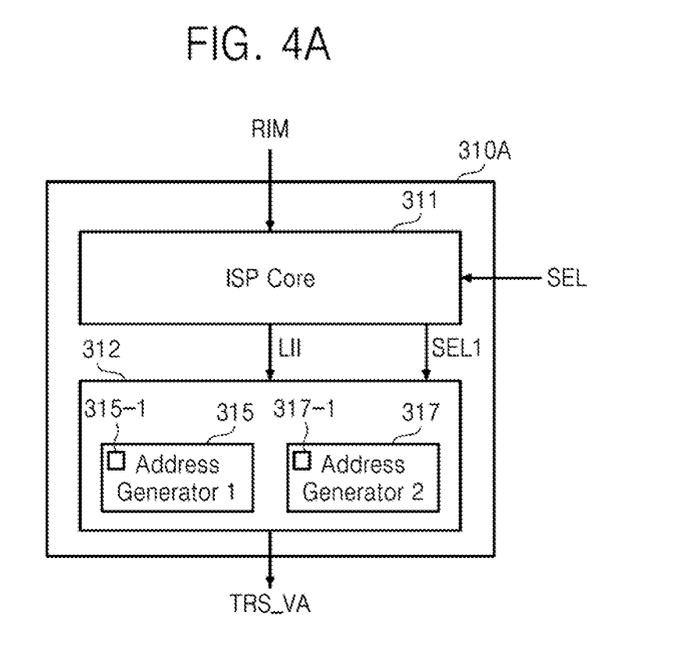
FIG. 4A is a block diagram of an example of an image signal processor (ISP) illustrated in FIG. 1.

FIG. 4A is a block diagram of an example 310A of the ISP 310 illustrated in FIG. 1. Referring to FIGS. 1, 3, and 4A, the ISP 310A includes an ISP core 311 and a virtual address generator block 312.

According to some embodiments, the ISP core 311 generates a selection signal SEL1 in response to the attribute information SEL. In detail, the ISP core 311 analyzes the pattern of the image data RIM and generates the selection signal SEL1 in response to the analysis result and the attribute information SEL.

The pattern of the image data RIM can indicate whether the image data RIM to be processed is rotated image data or unrotated image data. The ISP core 311 analyzes the pattern of the image data RIM and generates mode information about a processing mode for the image data RIM based on the analysis result. The processing mode includes a raster scan mode or a non-raster scan mode. At this time, the ISP core 311 generates the selection signal SEL1 in response to the mode information and the attribute information SEL.

According to some embodiments, the ISP core 311 also generates image information LII based on the image data RIM. The image information LII includes the coordinates of a current pixel to be processed, the size of the pixel, and the size of the image data RIM.

The pixel may be a physical point in a raster image or the smallest addressable element in an all points addressable display device. The smallest addressable element of a picture is represented on a screen. The address of the pixel corresponds to the physical coordinates of the pixel. The pixel refers to pixel data.

According to some embodiments, the virtual address generator block 312 includes a first virtual address generator 315 and a second virtual address generator 317. Although two virtual address generators 315 and 317 are illustrated in FIG. 4A, embodiments are not restricted thereto. The virtual address generator block 312 may include at least three virtual address generators that perform different algorithms.

The first virtual address generator 315 includes a first logic 315-1 which stores or executes a first algorithm, or information necessary to perform the first algorithm, for generating a virtual address. The second virtual address generator 317 includes a second logic 317-1 which stores or executes a second algorithm, or information necessary to perform the second algorithm, for generating a virtual address. Each logic 315-1 and 315-7 is a logic circuit. The virtual address generator block 312 selects or enables one of the first and second virtual address generators 315 and 317 in response to the selection signal SEL1.

Figure 5:
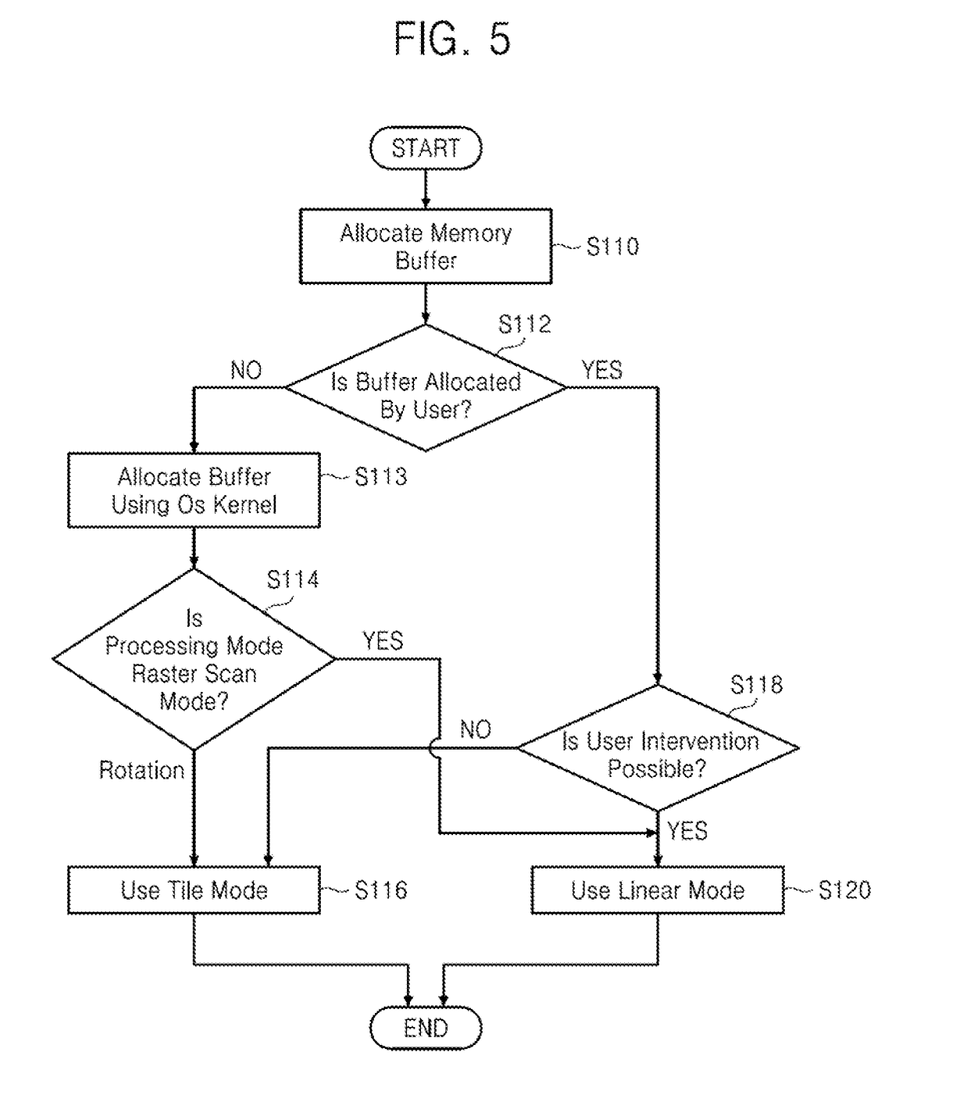
FIG. 5 is a flowchart of a method of operating a data processing system illustrated in FIG. 1 according to some embodiments of the inventive concept.
Figure 6:
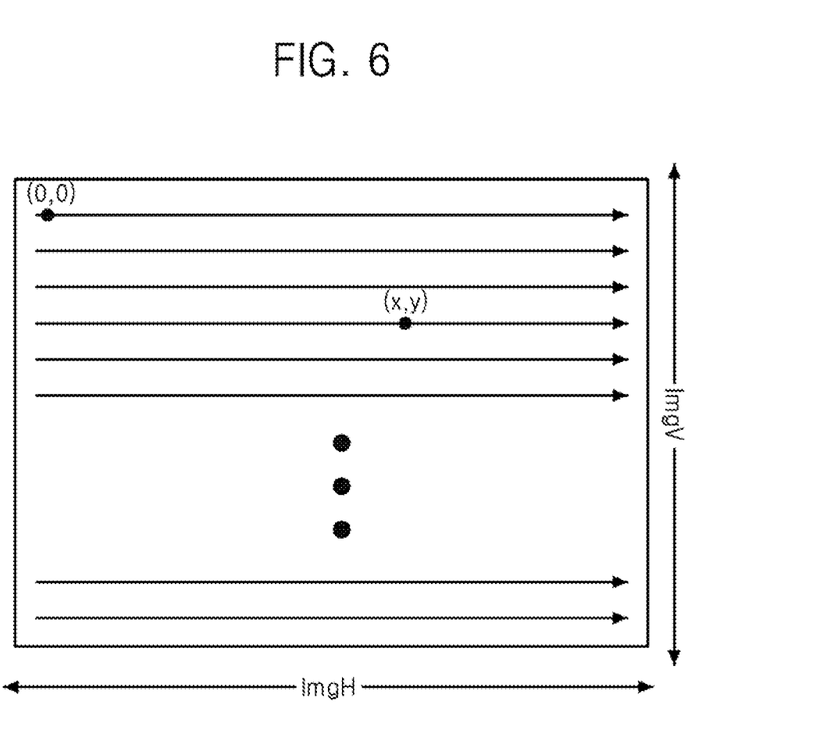
FIG. 6 is a diagram of a linear address map used to generate a virtual address according to some embodiments of the inventive concept.

FIG. 5 is a flowchart of a method of operating the data processing system 100 illustrated in FIG. 1, according to some embodiments of the inventive concept. FIG. 6 is a diagram of a linear address map used to generate a virtual address according to some embodiments of the inventive concept. Referring to FIGS. 1, 4A, 5, and 6, the memory buffer 410 is allocated for processing image data, which generally indicates image data related to the image data RIM generated by the capturing module 200 in operation S110.

When the allocation of the memory buffer 410 is performed by user intervention and user intervention is possible, i.e., in case of YES in operations S112 and S118, the software interface 357-1 is set to logic "1". Accordingly, the attribute information SEL has a value corresponding to logic "1".

According to some embodiments, the ISP core 311 generates the selection signal SEL1 for selecting or enabling the first virtual address generator 315 in response to the attribute information SEL corresponding to logic "1". Accordingly, the first virtual address generator 315 is enabled and the second virtual address generator 317 is disabled.

According to some embodiments, the first virtual address generator 315 generates a virtual address using a linear mode in operation S120. At this time, the first virtual address generator 315 generates a virtual address for a data transaction using the first algorithm stored in the first logic 315-1 according to Equation 1:

$$VA = x \times Bpp + y \times ImgH. \quad (1)$$

Referring to FIG. 6, (x,y) are the coordinates or position of a pixel to be currently processed, Bpp denotes the size of the pixel, and ImgH denotes the size, such as a horizontal resolution expressed in bytes, of the image data RIM. Bpp may stand for bytes per pixel. As expressed in Equation 1, virtual addresses are arranged in raster scan order. In FIG. 6, ImgV is a vertical resolution in number of lines of image data RIM.

When the allocation of the memory buffer 410 is not performed by user intervention, i.e., in case of NO in operation S112, the allocation of the memory buffer 410 is performed by the OS kernel 353 in operation S113, and the software interface 357-1 is set to logic "0". Accordingly, the attribute information SEL has a value corresponding to logic "0".

According to some embodiments, the ISP core 311 analyzes the pattern of the image data RIM and generates mode information about the mode of processing the image data RIM based on the analysis result. The ISP core 311 generates the selection signal SEL1 based on the attribute information SEL having the value corresponding to logic "0" and the mode information.

When the mode information indicates a raster scan mode, i.e., in case of YES in operation S114, the ISP core 311 generates the selection signal SEL1 for selecting the first virtual address generator 315. The first virtual address generator 315 generates a virtual address using the linear mode in operation S120, as described above. At this time, the first virtual address generator 315 generates a virtual address for a data transaction using the first algorithm stored in the first logic 315-1 according to Equation 1.

However, when mode information indicates a non-raster scan mode, and more particularly, a non-raster mode for processing image data that has been rotated using image rotation, i.e., in case of NO in operation S114; the ISP core 311 generates the selection signal SEL1 for selecting the second virtual address generator 317. Accordingly, the first virtual address generator 315 is disabled; the second virtual address generator 317 is enabled. The second virtual address generator 317 generates a virtual address using a tile mode in operation S116.

Figure 7:
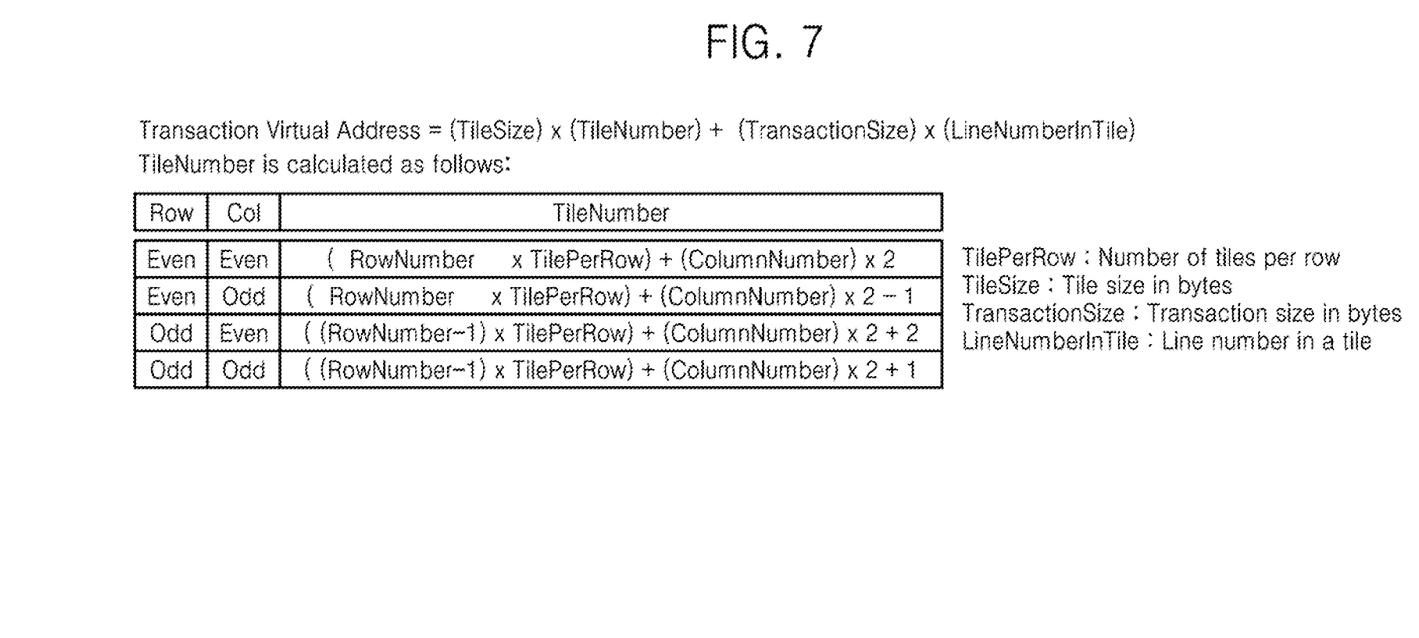
FIG. 7 is a conceptual diagram of a method of generating a virtual address and a method of generating a tile number according to some embodiments of the inventive concept.
Figure 8:
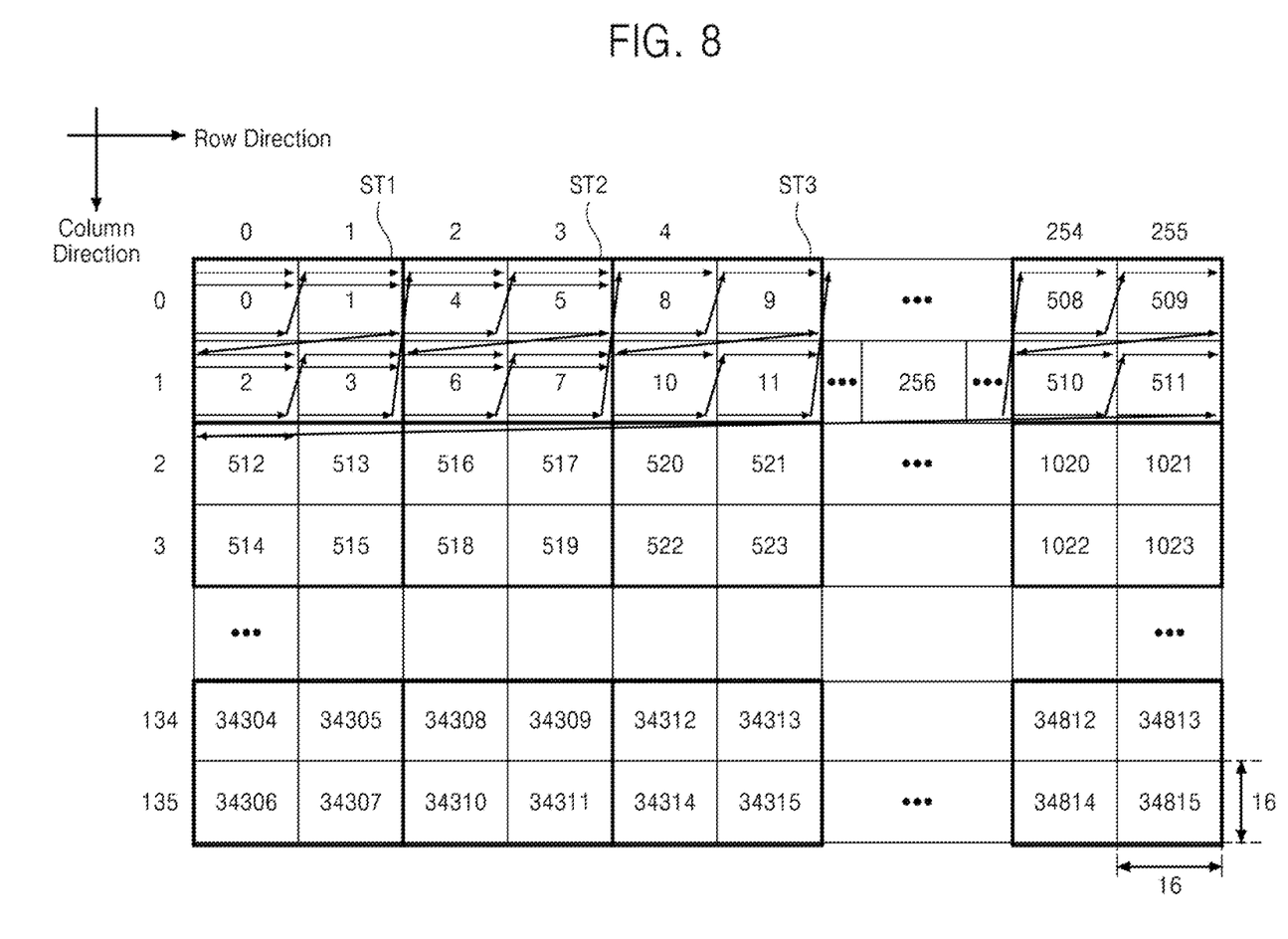
FIG. 8 illustrates a hierarchical tile address map used to generate a two-level virtual address according to some embodiments of the inventive concept.

FIG. 7 is a conceptual diagram of a method of generating a virtual address and a method of generating a tile number according to some embodiments of the inventive concept. FIG. 8 illustrates a hierarchical tile address map used to generate a two-level virtual address according to some embodiments of the inventive concept.

According to some embodiments, the second virtual address generator 317 generates a virtual address for a data transaction using the second algorithm stored in the second logic 317-1 according to Equation 2:

$$VA = TileSize \times TileNumber + TransactionSize \times LineNumberInTile, \quad (2)$$

where "TileSize" denotes the size of a tile, "TileNumber" denotes a number of a tile to be processed, "TransactionSize" denotes the size of data processed at each transaction, and "LineNumberinTile" denotes a line number included in the tile.

According to some embodiments, the second virtual address generator 317 generates TileNumber according to the embodiments illustrated in FIG. 7. For convenience' sake in the description, it is assumed that the resolution of the image data RIM is 4096×2176, TilePerRow is 256, TileSize is 1024 bytes (=16×16×4 bytes) in an RGB format, and TransactionSize is 64 bytes. A procedure for calculating TileNumber is described with reference to FIGS. 7 and 8.

When RowNumber is 2 (=Even) and ColumnNumber is 2 (=Even), TileNumber is calculated as follows:

TileNumber(=516)=RowNumber(=2)×TilePerRow
(=256)+ColumnNumber(=2)×2.

When RowNumber is 2 (=Even) and ColumnNumber is 1 (=Odd), TileNumber is calculated as follows:

TileNumber(=513)=RowNumber(=2)×TilePerRow
(=256)+ColumnNumber(=1)×2−1.

When RowNumber is 1 (=Odd) and ColumnNumber is 4 (=Even), TileNumber is calculated as follows:

TileNumber(=10)=(RowNumber(=1)−1)×TilePerRow
(=256)+ColumnNumber(=4)×2+2.

When RowNumber is 3 (=Odd) and ColumnNumber is 3 (=Odd), TileNumber is calculated as follows:

TileNumber(=519)=(RowNumber(=3)−1)×TilePer-
Row(=256)+ColumnNumber(=3)×2+1.

As shown in FIG. 8, when TileNumber is 256 and LineNumberinTile is 1, a virtual address VA for a data transaction calculated by the second virtual address generator 317 is defined as: VA=(1024 bytes)×256+(64 bytes)×1=0x4_0044.

When TileNumber is 34815 and LineNumberinTile is 15, the virtual address VA for a data transaction calculated by the second virtual address generator 317 is defined as:

$$VA = (1024 \text{ bytes}) \times 34815 + (64 \text{ bytes}) \times 1 = 0x21F\_FFC0.$$

Referring to the hierarchical tile address map used to generate a two-level virtual address illustrated in FIG. 8, a super tile includes n×m tiles, where "n" and "m" are natural numbers of at least 2. It may be that n=m or n≠m. Although each of super tiles ST1, ST2, and ST3 includes 2×2 tiles in the embodiments illustrated in FIG. 8, embodiments are not limited thereto. Each of 0th through 34815th tiles includes 16×16 pixels and the size of each pixel is 4 bytes in the RGB format.

Two-level hierarchical tiles can be organized according to the following three rules. First, pixels in a tile are addressed in linear order. Second, tiles in a super tile are arranged in linear order. Third, super tiles are arranged in linear order.

Figure 4B:
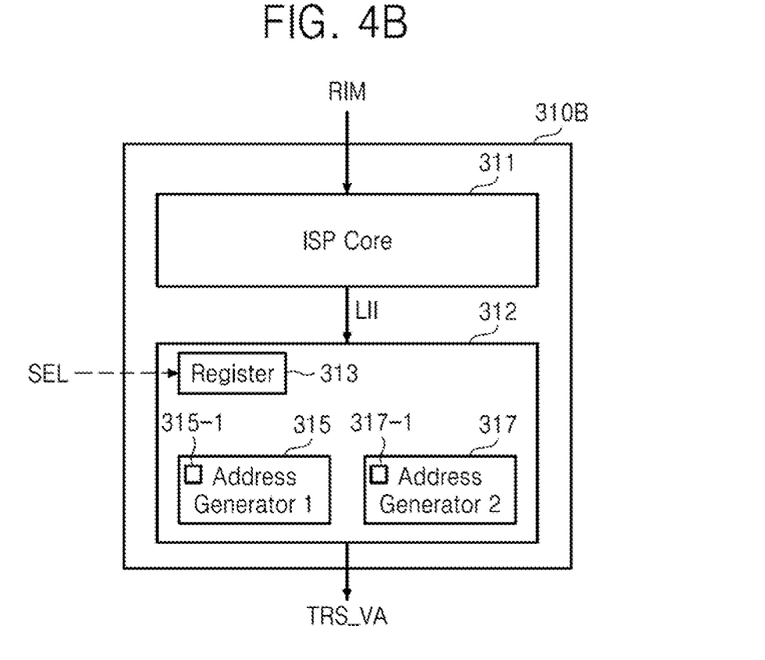
FIG. 4B is a block diagram of another example of an ISP illustrated in FIG. 1.

FIG. 4B is a block diagram of another example 310B of the ISP 310 illustrated in FIG. 1. Referring to FIGS. 1, 3, and 4B, the ISP 310B includes the ISP core 311 and the virtual address generator block 312.

According to some embodiments, the ISP core 311 analyzes the pattern of the image data RIM and generates mode information about a processing mode for the image data RIM based on the analysis result. The ISP core 311 also generates the image information LII together with the mode information. As described above, the mode information regarding the image data RIM indicates whether the image data RIM is rotated image data or unrotated image data.

According to some embodiments, the virtual address generator block 312 includes a register 313, the first virtual address generator 315, and the second virtual address generator 317. Although two virtual address generators 315 and 317 are illustrated in FIG. 4B, embodiments are not limited thereto. The virtual address generator block 312 may include at least three virtual address generators. The register 313 stores the attribute information SEL.

According to some embodiments, the first virtual address generator 315 includes the first logic 315-1 which stores or executes an algorithm for generating a virtual address. The second virtual address generator 317 includes the second logic 317-1 which stores or executes an algorithm for generating a virtual address. The first virtual address generator 315 generates a virtual address using the algorithm, such as Equation 1, stored in the first logic 315-1. The second virtual address generator 317 generates a virtual address using the algorithm, such as Equation 2, stored in the second logic 317-1.

According to some embodiments, the virtual address generator block 312 selects or enables one of the first or second virtual address generators 315 and 317 using the attribute information SEL stored in the register 313. At this time, the virtual address generator block 312 selects the second virtual address generator 317 when the attribute information SEL is "0" and selects the first virtual address generator 315 when the attribute information SEL is "1". Alternatively, the virtual address generator block 312 can select or enable one of the first or second virtual address generators 315 and 317 based on the attribute information SEL stored in the register 313 and the mode information received from the ISP core 311.

A method of selecting one of the first or second virtual address generators 315 and 317 has been described with reference to FIG. 5. The first virtual address generator 315 generates a virtual address using the method described with reference to FIGS. 5 and 6. The second virtual address generator 317 generates a virtual address using the method described with reference to FIGS. 5, 7, and 8.

Figure 9:
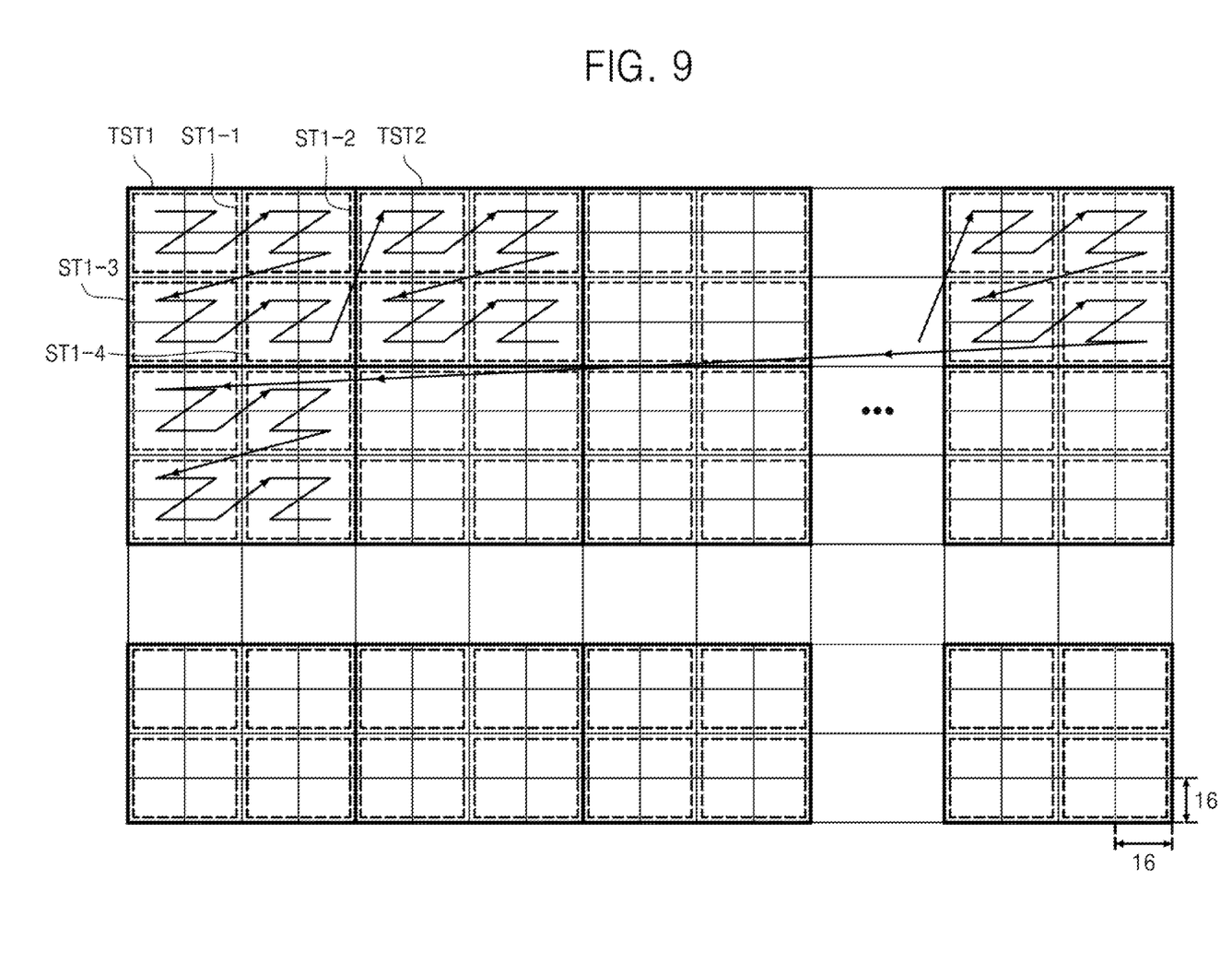
FIG. 9 illustrates a hierarchical tile address map used to generate a three-level virtual address according to some embodiments of the inventive concept.

FIG. 9 illustrates a hierarchical tile address map used to generate a three-level virtual address according to some embodiments of the inventive concept. Referring to FIG. 9, an ultra super tile TST1 includes super tiles ST1-1, ST1-2, ST1-3, and ST1-4. Each of the super tiles ST1-1 through ST1-4 includes tiles. Each of the tiles includes pixels. Although the single ultra super tile TST1 includes four super tiles ST1-1 through ST1-4 and each of the super tiles ST1-1 through ST1-4 includes four tiles in the embodiments illustrated in FIG. 9, embodiments are not limited thereto.

In embodiments of the inventive concept, an upper-level tile that includes tiles is named a super tile and an upper-level tile that includes super tiles is named an ultra super tile, but such naming is just for convenience' sake in the description.

Three-level hierarchical tiles are organized according to the following four rules. First, pixels in a tile are addressed in linear order. Second, tiles in a super tile are arranged in linear order. Third, super tiles in an ultra super tile are arranged in linear order. Fourth, ultra super tiles are arranged in linear order.

Although a two-level hierarchical tile address map is illustrated in FIG. 8 and a three-level hierarchical tile address map is illustrated in FIG. 9, those skilled in the art will understand the structure of at least a four-level hierarchical tile address map by referring to FIGS. 8 and 9.

As described above, according to some embodiments of the inventive concept, a virtual address generator, such as an ISP, selects one of a plurality of virtual address generators using at least one type of attribute and mode information and generates a virtual address for a data transaction, such as a write operation or a read operation, using the selected virtual address generator. Since the virtual address generator generates the virtual address using the virtual address generator selected based on at least one attribute and mode information, an address difference between adjacent pixels, or adjacent data transactions, is minimized. In other words, the occurrence of a TLB miss decreases. Accordingly, a virtual address generator can decrease the overhead of a system MMU implemented therein. As the overhead decreases, the performance of the virtual address generator and the performance of a system including the same increases. As a result, the performance of an MMU which translates a virtual address received from the virtual address generator into a physical address increases even in the case of an image rotation.

While embodiments of the inventive concept have been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A method of generating a virtual address in a data processing system controller, the method comprising:
   receiving attribute information which indicates whether there will be user intervention to allocate a memory buffer for storing image data;
   enabling one of a first virtual address generator using a linear mode mapping and a second virtual address generator using a tile mode mapping based on the attribute information; and
   generating the virtual address of a data transaction using the enabled virtual address generator;
   wherein the first virtual address generator is enabled when the attribute information indicates that there will be user intervention and
   the second virtual address generator is enabled when the attribute information indicates that there will not be user intervention.

2. The method of claim 1, wherein
   the first virtual address generator generates the virtual address based on coordinates of a pixel, a size of the pixel, and a size of the image data; and
   the second virtual address generator generates the virtual address based on a size of a tile in the image data, a number of the tile to be processed, a size of the data transaction, and a line number in the tile to be processed.

3. The method of claim 2, wherein the number of the tile to be processed is determined based on a function of a position of the tile and a total number of tiles included in a row of the image data.

4. The method of claim 2, further comprising
   analyzing a pattern of the image data wherein an analysis result indicates whether the image data is rotated image data or unrotated image data and generating information about a processing mode of the image data based on the analysis result,
   wherein the one of the first and second virtual address generators is enabled based on the analysis result and the information about the processing mode.

5. The method of claim 4, wherein
   the first virtual address generator is enabled when the processing mode is a raster scan mode for unrotated image data and
   the second virtual address generator is enabled when the processing mode is a non-raster scan mode for rotated image data.

6. The method of claim 2, wherein
   the second virtual address generator generates the virtual address to generate a hierarchical tile address map, the hierarchical tile address map comprises a plurality of super tiles arranged in linear order,
each of the super tiles comprises a plurality of tiles arranged in linear order, and
each of the tiles comprises a plurality of pixels addressed in linear order.

7. A system for generating memory addresses, comprising:
a virtual address generator that includes a first virtual address generator using a linear mode mapping and a second virtual address generator using a tile mode mapping,
wherein the virtual address generator
receives attribute information which indicates whether there will be user intervention to allocate a memory buffer for storing image data,
enables one of the first and second virtual address generators based on the attribute information, and
generates a virtual address of a data transaction using the enabled virtual address generator; and
a memory management unit that translates the virtual address into a physical address, wherein
the first virtual address generator is enabled when the attribute information indicates that there will be user intervention and
the second virtual address generator is enabled when the attribute information indicates that there will not be user intervention.

8. The system of claim 7, wherein
the first virtual address generator generates the virtual address based on coordinates of a pixel, a size of the pixel, and a size of the image data; and
the second virtual address generator generates the virtual address based on a size of a tile in the image data, a number of the tile to be processed, a size of the data transaction, and a line number in the tile.

9. The system of claim 8, wherein the number of the tile to be processed is determined based on a function which comprises a position of the tile and a total number of tiles comprised in a row of the image data.

10. The system of claim 8, further comprising
an image signal processor core that analyzes a pattern of the image data wherein an analysis result indicates whether the image data is rotated image data or unrotated image data and generates information about a mode of processing the image data based on the analysis result,
wherein the one of the first and second virtual address generators is enabled based on the analysis result and the information about the mode of processing.

11. The system of claim 10, wherein
the first virtual address generator is enabled when the processing mode is a raster scan mode for unrotated image data and
the second virtual address generator is enabled when the processing mode is a non-raster scan mode for rotated image data.

12. The system of claim 8, further comprising a central processing unit (CPU) that provides a software interface for receiving the attribute information.

13. The system of claim 8, wherein
the second virtual address generator generates the virtual address to generate a hierarchical tile address map,
the hierarchical tile address map comprises a plurality of super tiles arranged in linear order,
each of the super tiles comprises a plurality of tiles arranged in linear order, and
each of the tiles comprises a plurality of pixels addressed in linear order.

14. A system for generating memory addresses, comprising:
a virtual address generator that includes a first virtual address generator using a linear mode mapping and a second virtual address generator using a tile mode mapping,
wherein the virtual address generator receives attribute information which indicates there will be user intervention to allocate a memory buffer for storing image data, enables one of the first and second virtual address generators based on the attribute information,
wherein the first virtual address generator generates a virtual address based on coordinates of a pixel, a size of the pixel, and a size of the image data; and
the second virtual address generator generates the virtual address based on a size of a tile in the image data, a number of the tile to be processed, a size of data transaction, and a line number in the tile, wherein
the first virtual address generator is enabled when the attribute information indicates that there will be user intervention and
the second virtual address generator is enabled when the attribute information indicates that there will not be user intervention.

15. The system of claim 14, further comprising
an image signal processor core that analyzes a pattern of the image data wherein an analysis result indicates whether the image data is rotated image data or unrotated image data and generates information about a mode of processing the image data based on the analysis result, wherein
the first virtual address generator is enabled when the processing mode is a raster scan mode and
the second virtual address generator is enabled when the processing mode is a non-raster scan mode for image rotation.

16. The system of claim 14, further comprising
a memory management unit that translates the virtual address into a physical address; and
a central processing unit (CPU) that provides a software interface for receiving the attribute information.

17. The system of claim 14, wherein
the number of the tile to be processed is determined based on a function which comprises a position of the tile and a total number of tiles comprised in a row of the image data, and wherein
the second virtual address generator generates the virtual address to generate a hierarchical tile address map,
the hierarchical tile address man comprises a plurality of super tiles arranged in linear order,
each of the super tiles comprises a plurality of tiles arranged in linear order, and
each of the tiles comprises a plurality of pixels addressed in linear order.

* * * * *